US007302866B1

(12) United States Patent
Malkin et al.

(10) Patent No.: US 7,302,866 B1

(45) Date of Patent: Dec. 4, 2007

(54) DEVICE, SYSTEM, AND METHOD FOR STRUCTURAL HEALTH MONITORING

(75) Inventors: Matthew C. Malkin, Seattle, WA (US); Justin D. Kearns, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/621,594

(22) Filed: Jan. 10, 2007

(51) Int. Cl.
*G01D 7/00* (2006.01)

(52) U.S. Cl. ................................................ 73/862.041

(58) Field of Classification Search ............ 73/862.041
See application file for complete search history.

(56) References Cited

U.S. PATENT DOCUMENTS 5,644,085 A 7/1997 Lorraine et al.
6,589,180 B2 * 7/2003 Erikson et al. ............. 600/459
6,776,762 B2 * 8/2004 Erikson et al. ............. 600/459

OTHER PUBLICATIONS

Yu, Lingyu and Giurgiutiu, Victor, Damage Detection Using Guided Waves and Piezoelectric Wafer Active Sensor Arrays, 10 pages.

Giurgiutiu, Victor, Buli, Xu and Cuc Adrian, Dual Use of Traveling and Standing Lamb Waves for Structural Health Monitoring, 16 pages.

Casula, O., Poidevin, C., Cattiaux, G and Fleury, G., A Flexible Phased Array Transducer for Contact Examination of Component With Complex Geometry, 7 pages.

* cited by examiner

*Primary Examiner*—Edward Lefkowitz
*Assistant Examiner*—Octavia Davis
(74) *Attorney, Agent, or Firm*—Gregory A. Stephens; Moore & Van Allen, PLLC

(57) ABSTRACT

A phased array sensor assembly is presented that can be permanently adhered to and impart ultrasonic waves to a structural surface and receive ultrasonic waves from a structural surface. The sensor assembly includes piezo-electric disks, a plurality of electrically conductive epoxy film adhesive contacts positioned such that an electrical coupling is formed with the piezo-electric disks, piezo transducer flex wire trace circuits aligned to be electrically coupled respectively with the electrically conductive epoxy film adhesive contacts on one end and including a plurality of wire trace electrical contact pads on the other end, and a flexible polyimide layer. The polyimide layer includes laser ablated areas for exposing the contact pads such that they can be electrically coupled with an external device.

17 Claims, 6 Drawing Sheets

DEVICE, SYSTEM, AND METHOD FOR STRUCTURAL HEALTH MONITORING

FIELD OF THE INVENTION

The present invention relates to the ability to monitor the structural integrity of a structure or a specific vehicle, such as an aerospace vehicle, watercraft, terrestrial vehicle or the like.

BACKGROUND OF THE INVENTION

Damage tolerant structures such as aircraft frequently require non-destructive inspection. In-situ (permanently mounted to the vehicle structure) sensor systems that can cover large areas of a structure may require multiple sensing elements to achieve a satisfactory resolution, each with its own discrete wiring that is heavy and complex. This currently limits placement of sensors with large connectors and wiring to the interior of aircraft to avoid excessive aerodynamic drag. But, interior installations may be restricted by the bulk of sensors from prior solutions.

Retrofit installation requirements and structural access limitations may require, however, that sensing systems and electrical connectors for sensors be located on the exterior of aircraft surfaces, in the airstream, or in interior locations having limited space available. Thus, structures can be effectively inspected with in-situ phased array ultrasonic sensor systems on the exterior surface of a vehicle only if they are thin (low profile) enough to minimize drag. Additionally, tight clearances exist on interior structures that may also require thin sensing elements.

What is needed is a system that employs a thin laminate phased array and connector pads that allow the complete sensor assembly to be placed in the airstream of a vehicle or within confined tight interior spaces in which no cable need be permanently attached to the sensing head.

BRIEF SUMMARY OF THE INVENTION

In accordance with an embodiment of the present invention, a phased array sensor assembly is presented that can impart ultrasonic waves to a structural surface and receive ultrasonic waves from a structural surface. The sensor assembly includes a plurality of piezo-electric disks with electrodes that are electrically accessible on one side, a plurality of electrically conductive epoxy film adhesive contacts substantially aligned and positioned such that an electrical coupling is formed with the electrode contact side of the respective plurality of piezo-electric disks, a plurality of piezo transducer flex wire trace circuits aligned to be electrically coupled respectively with the plurality of electrically conductive epoxy film adhesive contacts on one end and including a plurality of wire trace electrical contact pads on the other end, and a flexible polyimide layer including a plurality of laser ablated areas for exposing the plurality of wire trace electrical contact pads through a side of the sensor assembly such that the plurality of wire trace electrical contact pads can be electrically coupled with an external device.

A filler layer comprised of non-conductive adhesive bonds the piezo-electric disks, electrically conductive epoxy film adhesive contacts, piezo transducer flex wire trace circuits, and the polyimide layer together to form a thin profile, flexible sensor assembly capable of being permanently mounted to a structural surface.

The sensor assembly can also include alignment verification means for verifying that an external device is properly coupled to the sensor assembly. The alignment verification means includes a pair of exposed contact pads and a connecting wire trace embedded within the sensor assembly. The sensor assembly can also be encapsulated in a material to protect it from environmental conditions.

In accordance with another embodiment of the present invention, a data acquisition system for structural health monitoring of a specific vehicle is presented. The data acquisition system can impart ultrasonic waves to a structural surface and receive ultrasonic waves from the structural surface. The data acquisition system includes a computing device that can generate and control sensor assembly signals to and from a plurality of piezo-electric disks. The computing device also analyzes data received from a sensor assembly. The sensor assembly is the same as previously described.

The data acquisition system also includes is an interface module for coupling the computing device with the sensor assembly. The interface module includes a sensor assembly connector head containing a set of spring loaded contact pins, a mounting component that provides a temporary physical coupling (e.g., suction cup) to the structural surface, and a data acquisition connector head having a port to receive a cable that can be coupled to the data acquisition computing device.

Alternatively, the data acquisition connector head could include a wireless module for transmitting and receiving electrical signals to and from the data acquisition computing device.

The data acquisition system computing device includes a function generator, an oscilloscope, and relays, that can generate and control the sensor assembly signals to and from the piezo-electric disks. The computing device also includes software for controlling the function generator, the oscilloscope, and the relays as well as interpreting the signals generated by the piezo-electric disks such that anomalies can be translated into images to be stored and displayed.

In accordance with another embodiment of the present invention, there is presented a data acquisition method of structural health monitoring of a specific vehicle. The method utilizes a data acquisition system comprised of a flexible thin sensor assembly that can be permanently mounted to the structure, a data acquisition computing device, and an interface module.

The interface module is coupled to a phased array sensor assembly that can be permanently adhered to a structure to be inspected. An alignment check is performed to ensure that a connector head on the interface module is properly aligned with the sensor assembly such that each of the contact pads that are exposed on the sensor assembly is in electrical contact with corresponding contacts in the connector head. The interface module is then coupled to a data acquisition computing device that generates an electrical signal using a function generator. The electrical signal is sent to the sensor assembly via the interface module to cause each piezo-electric disk in the sensor assembly to transduce the electrical signal and induce ultrasonic strain waves into the structure being inspected. Ultrasonic strain waves present in the structure being inspected are received in each piezo-electric element and converted to electrical signals that are sent to the data acquisition computer for analysis. The data acquisition computer software can construct an image of anomalies in the area serviced by the sensor assembly on the structure being inspected.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

The present invention describes a thin (low-profile) phased array sensor and sensing system and method intended for structural health monitoring of a large structural area using piezoelectric elements to generate and receive ultrasonic waves. It can be permanently attached to the structure under inspection. The sensor includes electrical contact pads to replace bulky connectors or permanently attached wiring. The thin, flexible, conformal design and the method of electrical access allow for installation of the sensor on the exterior surface of an aircraft, for example, or on interior structures with close clearances.

Figure 1:
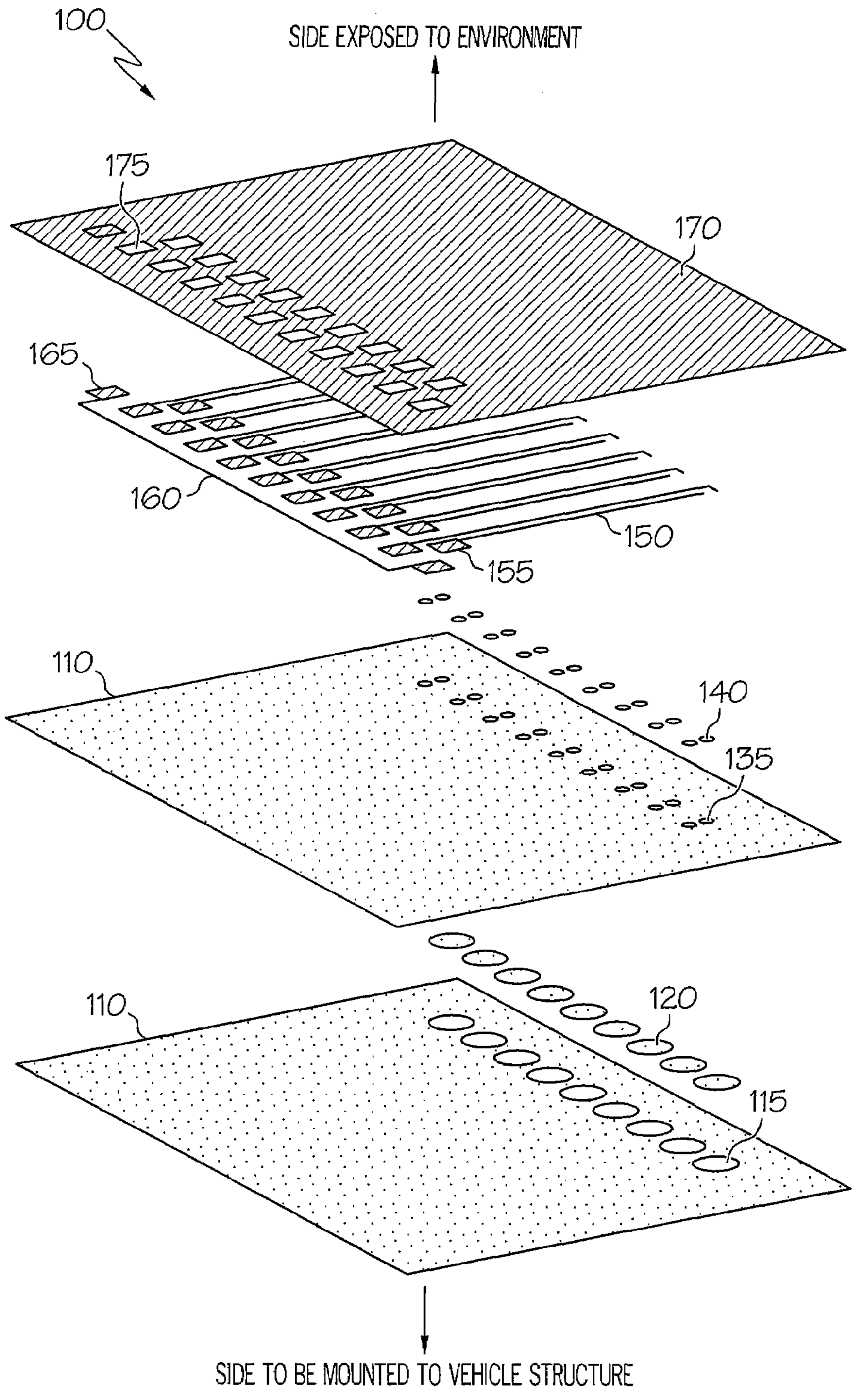
FIG. 1 is an illustration of an example of a sensor assembly in an exploded view in accordance with an embodiment of the present invention.

FIG. 1 is an illustration of an example of a thin profile flexible sensor assembly 100 in an exploded view in accordance with an embodiment of the present invention. The sensor assembly 100 will be described from the bottom up or from the inside out meaning the first element described makes up the side of the overall sensor assembly 100 that is mountable to a structure to be inspected while the last element described remains exposed to the environment when the sensor assembly 100 is in place.

A filler layer 110 is comprised of a non-conductive adhesive for bonding the sensor assembly 100 on one side to a structure to be inspected and on the other side to the other layers of the sensor assembly 100. The filler layer 110 further includes a plurality of element positioner holes 115 cut to snugly accommodate a corresponding plurality of piezo-electric electrode single sided terminal disks 120. The piezo-electric electrode single sided terminal disks 120 are capable of transducing electrical signals in order to introduce a strain wave in to the structure to which it is attached. Interference between the waves generated by each piezo-electric disk 120 is controlled to impart desired waves into the structure. Similarly, strain waves in the structure strain the piezo-electric disks 120, generating electrical signals, which can be detected and interpreted by a data acquisition computer.

Additional filler layer 110 non-conductive adhesive is layered on top of the plurality piezo-electric disks 120. There are also a plurality of openings or holes 135 that are smaller than and positioned above the piezo-electric disks 120. Each hole 135 is then filled with an electrically conductive epoxy 140 to create an electrically conductive path from the piezo-electric disks 120 through the filler layer 110 to a plurality of piezo transducer flex wire traces 150 that include contact pads 155. This arrangement permits electrical signals to travel between the electrodes on the piezo-electric disks 120 and the contact pads 155 on the wire traces 150 by way of the electrically conductive epoxy 140.

There is also included an additional wire trace 160 comprised of two additional contact pads 165 provided on either side of the plurality of wire trace contact pads 155. This additional wire trace 160 serves as an alignment indicator to ensure proper alignment between the sensor assembly 100 and a connector head (not shown). The connector head is part of an interface module (not shown) that can couple a data acquisition computer to the sensor assembly 100.

The two alignment indicator electrical contact pads 165 of wire trace 160 serve to complete a circuit that will indicate proper alignment between the connector head and the sensor assembly 100. The alignment circuit is comprised of the two pads 165 embedded within the sensor assembly 100, the connecting trace 160 on the sensor, two pins in the connector head of the interface module, and a battery and light-emitting diode mounted inside the connector head of the interface module (not shown). Illumination of the LED when the connector head is secured serves as an indicator that the connector head is properly aligned with the sensor assembly data acquisition connector pads on wire trace(s) 150.

A polyimide layer 170 serves as the sensor assembly outer covering providing flexible rigidity to the sensor assembly 100. It is further encapsulated with a material that will provide environmental protection for the entire sensor assembly 100 since it is likely the sensor assembly 100 will be placed, among other places, in the airstream of an aircraft, for instance. In addition, the polyimide layer 170 includes laser ablated areas (holes) 175 that correspond to the contact pads of the wire traces 150 and 160. The contact pads are comprised of or plated with environmentally suitable materials such as, for instance, gold plating to resist corrosion or other detrimental environmental effects.

The entire sensor assembly 100 when bonded together forms a thin flexible profile (on the order of 0.014 inches or 0.36 mm in thickness) capable of being adhered or mounted to curved surfaces if necessary.

Figure 2:
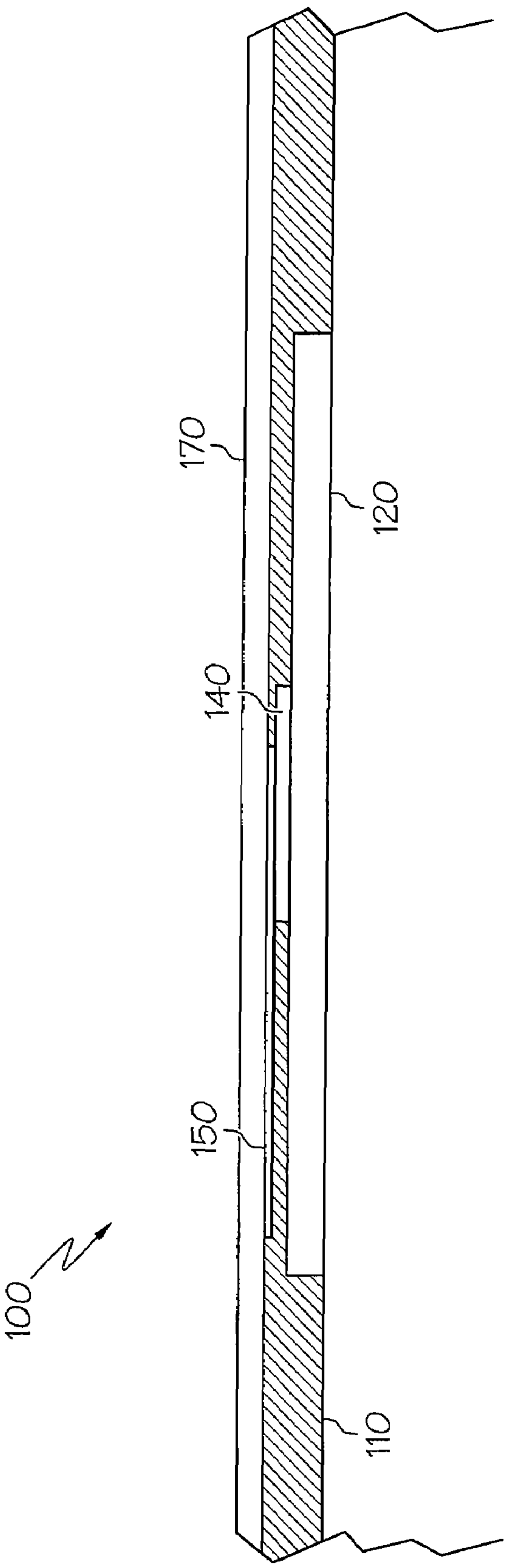
FIG. 2 is an illustration of an example of a sensor assembly in a cross-sectional view in accordance with an embodiment of the present invention.

FIG. 2 is an illustration of an example of a sensor assembly 100 in a cross-sectional view in accordance with an embodiment of the present invention. A cross-hatched region identifies the filler layer 110 comprised of a non-conductive adhesive material, such as, for instance, 4 mil Ablefilm 563K. From this perspective it is clear that the filler layer 110 serves to surround and hold in place the other active elements of the sensor assembly 100. One of the piezo-electric disks 120 is shown somewhat flush with the lower surface of the filler layer 110. The piezo-electric disks 120 can be, for instance, 10 mil APC-850 piezo-electric, silk screen electrode, single sided terminals. This indicates that the sensor assembly, when mounted, will allow the piezo-electric disks 120 to physically contact the surface of a structure to be inspected.

On top of the piezo-electric disk 120 is one of the electrically conductive epoxy 140 contacts. The conductive epoxy 140 contacts 140 can be, for instance, 4 mil Ablefilm CF3350. On top of the electrically conductive epoxy 140 contact is one of the wire traces 150. From this cross-sectional perspective it is evident that an electrically conductive path can is formed from the piezo-electric disk(s) 120 to the wire trace(s) 150 via the electrically conductive epoxy 140 contact(s).

Covering the wire traces is the polyimde layer 170 which can be, for instance, a 7.5 mil Pyralux LF9150. The polyimide layer 170 is adhered to the sensor assembly 100 via the non-conductive adhesive filler layer 110. Thus, the polyimide layer provides a degree of flexibility to the sensor assembly while the non-conductive adhesive filler layer 110 holds the electrical components in place and allows the sensor assembly to be adhered to a much larger structure. Lastly, the polyimide layer 170 includes laser ablated areas 175 that expose the contact pads 155 and 165 (see, FIG. 1) of wire traces 150 and 160 such that an interface module can be electrically coupled to the sensor assembly 100.

Figure 3:
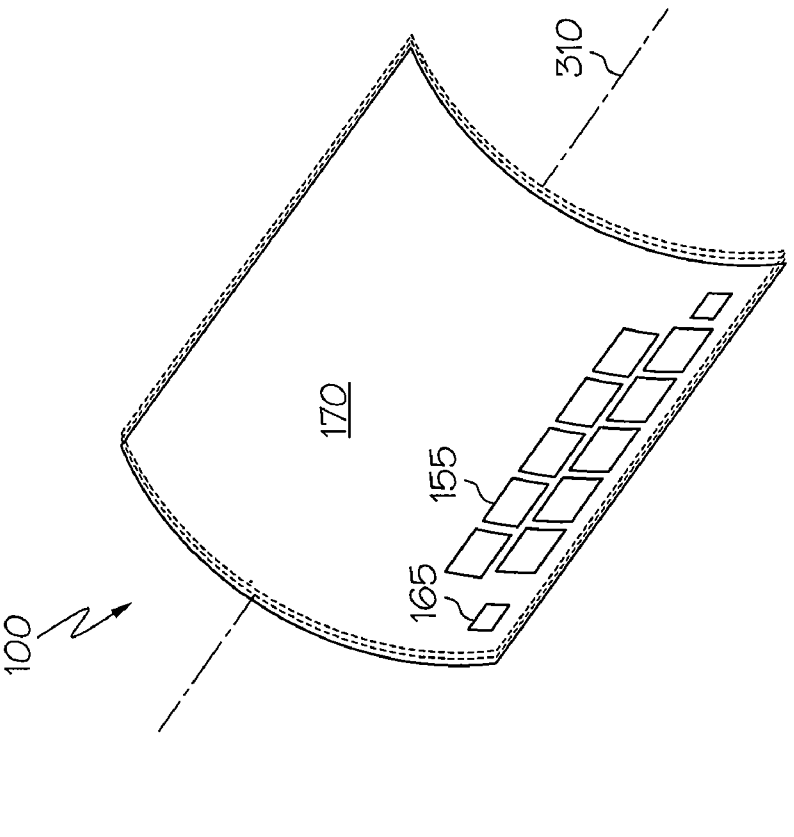
FIG. 3 is an illustration of an example of the flexibility of a sensor assembly in accordance with an embodiment of the present invention.

FIG. 3 is an illustration of an example of the flexibility of a sensor assembly 100 in accordance with an embodiment of the present invention. In this figure the exterior surface (polyimide layer 170) is shown while the sensor assembly 100 as a whole is flexed about an imaginary longitudinal axis 310. The contact pads 155 and 165 of the wire traces 150 and 160 are visible.

Figure 4:
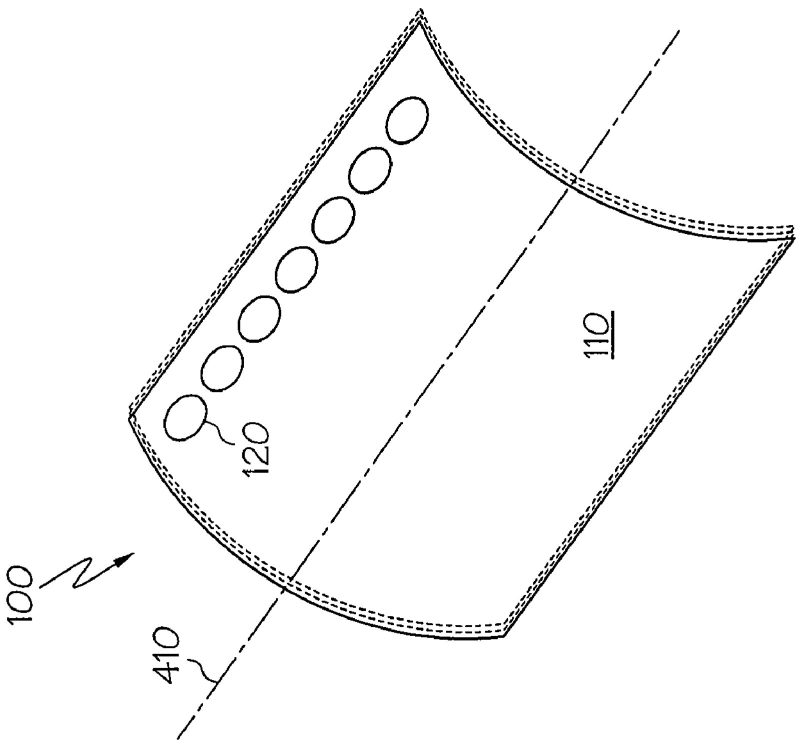
FIG. 4 is another illustration of an example of the flexibility of a sensor assembly from a different perspective in accordance with an embodiment of the present invention.

FIG. 4 is another illustration of an example of the flexibility of a sensor assembly 100 from a different perspective in accordance with an embodiment of the present invention. In this figure the interior surface (filler layer 110) is shown while the sensor assembly 100 as a whole is flexed about an imaginary longitudinal axis 410. The piezo-electric disks 120 are visible.

Figure 5:
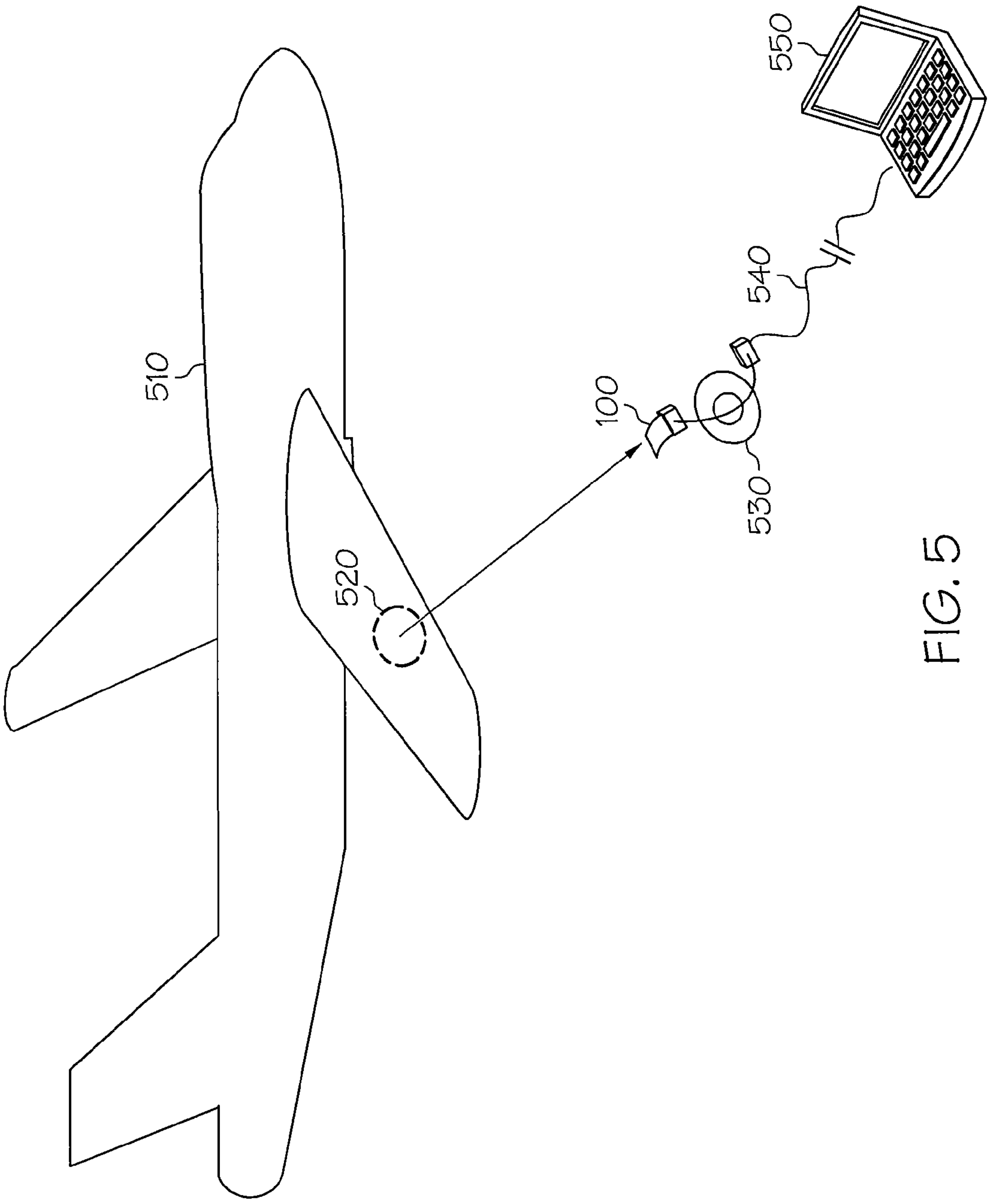
FIG. 5 is an illustration of an example of a sensor assembly and data acquisition system applied to an aircraft in accordance with an embodiment of the present invention.

FIG. 5 is an illustration of an example of a sensor assembly 100 and data acquisition system applied to an aircraft 510 in accordance with an embodiment of the present invention. In this example, an aircraft 510 is shown with an area to be inspected 520 located on one of the wings. It should be noted that an aircraft wing is a generally a curved surface meaning the sensor assembly that is adhered in this location must take a matching curved profile to maintain physical contact between the plurality of piezo-electric disks 120 and the aircraft 510.

An interface module 530 is shown and serves to provide an operable electrical connection between the sensor assembly 100 and a data acquisition computing device 550 such as, for instance, a special purpose hardware and software equipped laptop computer. For the sake of illustration, a cable 540 is shown linking the data acquisition computing device 550 and the interface module 530.

Figure 6:
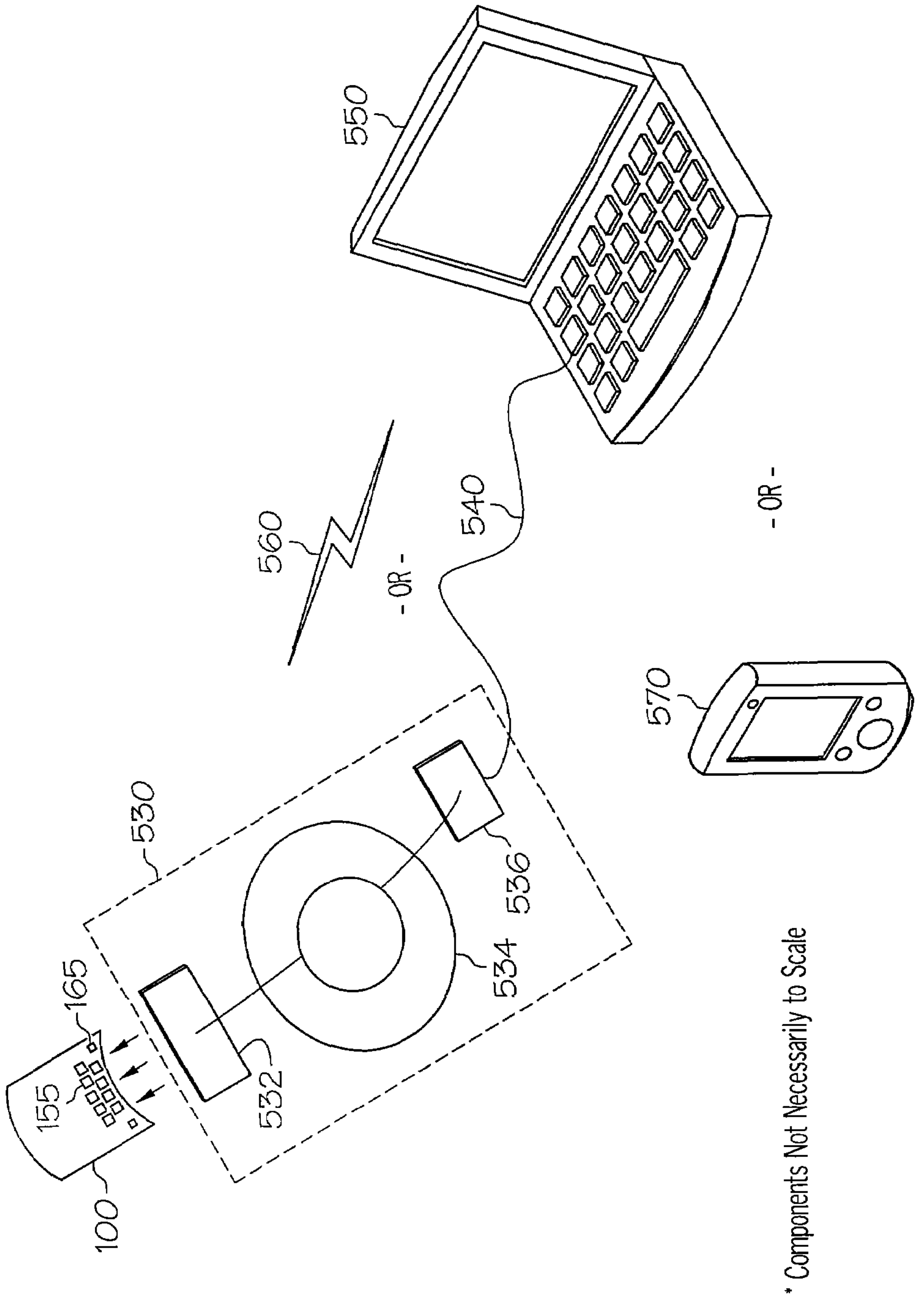
FIG. 6 is an illustration of an example of a sensor assembly and data acquisition system in accordance with an embodiment of the present invention.

FIG. 6 is an illustration of an example of a sensor assembly 100 and data acquisition system in accordance with an embodiment of the present invention. This figure describes the relationship, coupling, and interaction among the sensor assembly 100, the interface module 530, and the data acquisition computing device 550. It should be noted that the cabled connection 540 can be replaced by a suitable wireless communication 560 protocol capable of sending and receiving the requisite system signals. In addition, the data acquisition computing device 550 could also take the form of a special purpose hardware and software equipped personal digital assistant (PDA) 570.

The interface module 530 is generally comprised of a sensor assembly connector head 532 containing a set of spring loaded contact pins. The spring loaded contact pins, when properly aligned with the sensor assembly wire trace contact pads 155, provide an electrical connection between the sensor assembly 100 and the data acquisition computing device 550. The spring loading aspect facilitates contact if the surface the sensor assembly is mounted to happens to be curved. The rest of the sensor assembly connector head 532 serves as a stabilizing brace to assist in keeping the interface module 530 in place when coupled to a sensor assembly 100. The interface module 530 may also include a component such as a suction cup 534 that provides a temporary mechanical/physical coupling to the structure being inspected. There may also be a data acquisition connector head 536 that serves as another stabilizing brace as well as providing a port to receive a cable that is coupled to the data acquisition computing device 550.

The data acquisition computing device 550 is comprised of a function generator, oscilloscope, and relays, for generating and controlling the sensor assembly signals to and from the piezo-electric disks, as well as software for controlling the hardware and interpreting the signals. Additional elements typically associated with computer devices may be included such as, for instance, memory or data storage components that can be both volatile or non-volatile as well as removable storage media, and display means for visually inspecting the results of any tests, etc.

Figure 7:
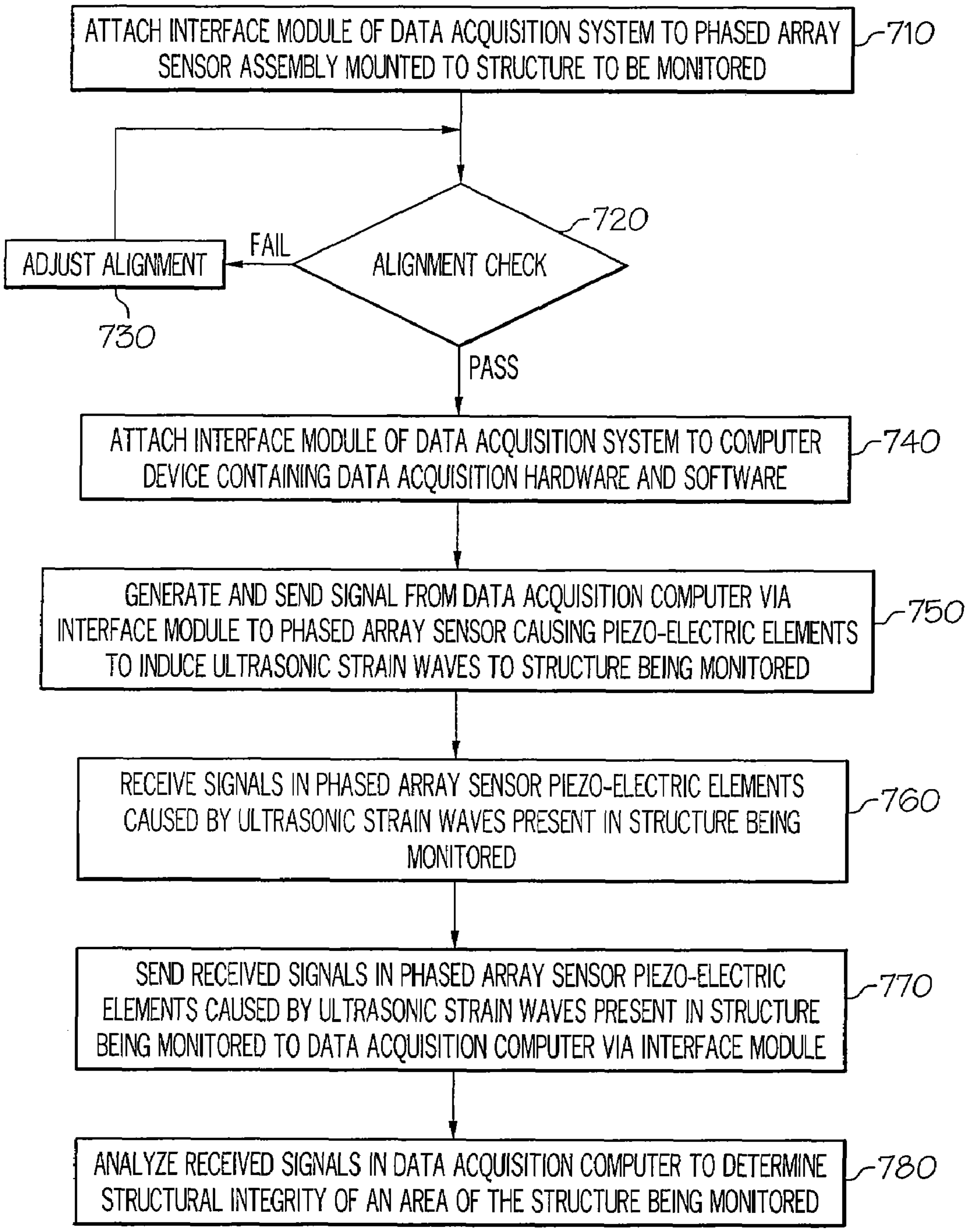
FIG. 7 is a flow chart of an exemplary method for obtaining structural health data in accordance with an embodiment of the present invention.

FIG. 7 is a flow chart of an exemplary method for obtaining structural health data in accordance with an embodiment of the present invention. An interface module is coupled to a phased array sensor assembly that is permanently adhered to a structure to be inspected 710. An alignment check 720 is performed to ensure that a connector head on the interface module is properly aligned with the sensor assembly such that each of the contact pads that are exposed on the sensor assembly is in electrical contact with corresponding contacts in the connector head. If this check fails, the connector head is re-aligned 730 until the alignment check 720 indicates a positive result. Once the interface module is attached and aligned properly with the phased array sensor assembly, it is further coupled to a data acquisition computing device 740.

Once all the couplings among the data acquisition computer, interface module, and sensor assembly have been made, an electrical signal is generated and sent from a function generator within the data acquisition computer to the sensor assembly 750 causing each piezo-electric disk in the sensor assembly to transduce the electrical signal and induce ultrasonic strain waves into the structure being inspected.

Interference among the ultrasonic strain waves created by each piezo-electric disk is controlled via the data acquisition computer to introduce specific waves into the structure being inspected. Consequently, ultrasonic strain waves present in the structure being inspected also strain each piezo-electric element 760 generating electrical signals that are returned 770 to the data acquisition computer for analysis 780. The data acquisition computer software can construct an image of anomalies in the area serviced by the sensor assembly on the structure being inspected.

The foregoing describes an invention that can create and receive directed strain waves in a thin, unitized package (sensor assembly) to non-destructively inspect a structure by providing a means to produce an image of anomalies in the structure. The sensor assembly is a component of a larger data acquisition system for structural health monitoring. The sensor assembly is thin enough to be mounted to the exterior of a flight vehicle or in interior applications with minimal clearance, and has no loose (non-integrated) data collection or power wiring.

The phased array configuration provides the capability to perform wide area inspection from a single point minimizing wiring required for a sensor system. The flexible substrate material further allows mounting to structures with some curvature. The unitized nature of the sensor assembly also allows for easy installation. The phased array piezo-electric disks are properly spaced and electrical contact pads are integrated in to the sensor assembly. All that is required for the sensor assembly to be operational is to bond it to the structure.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A phased array sensor assembly that can impart ultrasonic waves to a structural surface and receive ultrasonic waves from a structural surface, the sensor assembly comprising:

- a plurality of piezo-electric disks that are electrically accessible on one side;
- a plurality of electrically conductive epoxy film adhesive contacts substantially aligned and positioned such that an electrical coupling is formed with the electrically accessible side of the respective plurality of piezo-electric disks;
- a plurality of piezo transducer flex wire trace circuits aligned to be electrically coupled respectively with the plurality of electrically conductive epoxy film adhesive contacts on one end and including a plurality of wire trace electrical contact pads on the other end;
- a flexible polyimide layer including a plurality of laser ablated areas for exposing the plurality of wire trace electrical contact pads through a side of the sensor assembly such that the plurality of wire trace electrical contact pads can be electrically coupled with an external device; and
- a filler layer comprised of non-conductive adhesive for bonding the plurality of piezo-electric disks, plurality of electrically conductive epoxy film adhesive contacts, plurality of piezo transducer flex wire trace circuits, and the polyimide layer together to form a thin profile, flexible sensor assembly capable of being permanently mounted to a structural surface.

2. The sensor assembly of claim 1 further comprising alignment verification means for verifying that an external device is properly coupled to the sensor assembly.

3. The sensor assembly of claim 2 wherein the alignment verification means comprises a pair of exposed contact pads and a connecting wire trace embedded within the sensor assembly.

4. The sensor assembly of claim 1 further comprising an encapsulation material to protect the sensor assembly from environmental conditions.

5. The sensor assembly of claim 1 wherein the sensor assembly is flexible enough to be adhered to curved structural surfaces.

6. The sensor assembly of claim 1 wherein the sensor assembly is small enough to be adhered to structural surfaces in tight spaces.

7. The sensor assembly of claim 1 wherein the filler layer of non-conductive adhesive is comprised of 4 mil Ablefilm 563K.

8. The sensor assembly of claim 1 wherein the electrically conductive epoxy film adhesive contacts are comprised of 4 mil Ablefilm CF3350.

9. The sensor assembly of claim 1 wherein the polyimide layer is comprised of 7.5 mil Pyralux LF9150.

10. The sensor assembly of claim 1 wherein the piezo-electric disks are comprised of 10 mil APC-850 piezo-electric, silk screen electrode, single sided terminals.

11. A data acquisition system that can impart ultrasonic waves to a structural surface and receive ultrasonic waves from a structural surface comprising:

- a computing device for generating and controlling sensor assembly signals to and from a plurality of piezo-electric disks via an interface module, and analyzing data received from a sensor assembly via the interface module;
- a sensor assembly capable of being permanently mounted to the structural surface comprised of:
  - a plurality of piezo-electric disks that are electrically accessible on one side;
  - a plurality of electrically conductive epoxy film adhesive contacts substantially aligned and positioned such that an electrical coupling is formed with the electrically accessible side of the respective plurality of piezo-electric disks;
  - a plurality of piezo transducer flex wire trace circuits aligned to be electrically coupled respectively with the plurality of electrically conductive epoxy film adhesive contacts on one end and including a plurality of wire trace electrical contact pads on the other end;

a polyimide layer including a plurality of laser ablated areas for exposing the plurality of wire trace electrical contact pads through a side of the sensor assembly such that the plurality of wire trace electrical contact pads can be electrically coupled with an interface module; and a filler layer comprised of non-conductive adhesive for bonding the plurality of piezo-electric disks, plurality of electrically conductive epoxy film adhesive contacts, plurality of piezo transducer flex wire trace circuits, and the polyimide layer together to form a thin profile, flexible sensor assembly capable of being permanently mounted to a structural surface, and an interface module for coupling the computing device with the sensor assembly.

12. The data acquisition system of claim 11 wherein the interface module comprises:

a sensor assembly connector head containing a set of spring loaded contact pins;

a mounting component that provides a temporary physical coupling to the structural surface;

a data acquisition connector head for providing a port to receive a cable that can be coupled to the data acquisition computing device.

13. The data acquisition system of claim 11 wherein the interface module comprises:

a sensor assembly connector head containing a set of spring loaded contact pins;

a mounting component that provides a temporary physical coupling to the structural surface;

a data acquisition connector head including a wireless module for transmitting and receiving electrical signals that can be coupled to the data acquisition computing device.

14. The data acquisition system of claim 12 wherein the mounting component that provides a temporary physical coupling to the structural surface is comprised of a suction cup.

15. The data acquisition system of claim 11 wherein the computing device comprises:

a function generator, an oscilloscope, and relays, for generating and controlling the sensor assembly signals to and from the piezo-electric disks; and software for:

controlling the function generator, the oscilloscope, and the relays; and interpreting the signals generated by the piezo-electric disks.

16. A method of obtaining structural health data from a structure via a data acquisition system that utilizes a flexible thin sensor assembly permanently mounted to the structure, the method comprising:

coupling an interface module to a phased array sensor assembly that is permanently adhered to a structure to be inspected;

performing an alignment check to ensure that a connector head on the interface module is properly aligned with the sensor assembly such that each of the contact pads that are exposed on the sensor assembly is in electrical contact with corresponding contacts in the connector head;

coupling the interface module to a data acquisition computing device;

generating an electrical signal using a function generator within the data acquisition computer;

sending the electrical signal to the sensor assembly to cause each piezo-electric disk in the sensor assembly to transduce the electrical signal and induce ultrasonic strain waves into the structure being inspected;

receiving ultrasonic strain waves present in the structure being inspected in each piezo-electric element;

generating electrical signals that correspond to the received ultrasonic strain waves; and sending the electrical signals that correspond to the received ultrasonic strain waves to the data acquisition computer for analysis.

17. The method of claim 16 wherein the data acquisition computer software can construct an image of anomalies in the area serviced by the sensor assembly on the structure being inspected.

* * * * *